US008983480B2

(12) United States Patent  
Rezaiifar et al.

(10) Patent No.: US 8,983,480 B2
(45) Date of Patent: Mar. 17, 2015

(54) MULTIPLEXING ON THE REVERSE LINK FEEDBACKS FOR MULTIPLE FORWARD LINK FREQUENCIES

(75) Inventors: Ramin Rezaiifar, San Diego, CA (US); Parag Agashe, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 12/906,378

(22) Filed: Oct. 18, 2010

(65) Prior Publication Data

US 2011/0026497 A1   Feb. 3, 2011

Related U.S. Application Data

(62) Division of application No. 11/397,873, filed on Apr. 3, 2006, now Pat. No. 8,868,118.

(60) Provisional application No. 60/669,437, filed on Apr. 8, 2005.

(51) Int. Cl.
*H04W 72/04* (2009.01)
*H04J 13/00* (2011.01)
*G11B 5/40* (2006.01)
*G11B 5/84* (2006.01)

(52) U.S. Cl.
CPC ........ *H04W 72/0466* (2013.01); *H04J 13/0003* (2013.01); *G11B 5/40* (2013.01); *G11B 5/8404* (2013.01)
USPC ............................ 455/450; 455/515; 455/445

(58) Field of Classification Search
CPC .......... H04W 52/365; H04W 72/0466; H04W 72/046; H04J 13/0003
USPC ........................ 455/522, 526, 515, 450, 445
See application file for complete search history.

(56) References Cited

U.S. PATENT DOCUMENTS

| | | | |
|---|---|---|---|
| 6,069,883 A | 5/2000 | Ejzak et al. | |
| 6,188,767 B1 | 2/2001 | Needham et al. | |
| 6,366,779 B1 * | 4/2002 | Bender et al. | 455/450 |
| 6,442,152 B1 | 8/2002 | Park et al. | |
| 6,681,112 B1 * | 1/2004 | Schwarz et al. | 455/436 |
| 6,714,528 B1 * | 3/2004 | Moon et al. | 370/342 |

(Continued)

FOREIGN PATENT DOCUMENTS

| | | |
|---|---|---|
| CN | 1421111 A | 5/2003 |
| EP | 1353480 A1 | 10/2003 |

(Continued)

OTHER PUBLICATIONS

European Search Report—EP10176243—Search Authority—Munich—Oct. 11, 2010.

(Continued)

*Primary Examiner* — Benjamin Lamont
(74) *Attorney, Agent, or Firm* — Eric Ho

(57) ABSTRACT

A method and apparatus for multiplexing reverse link feedback channels on a single reverse link frequency supporting multiple forward link frequencies for forward link channels is provided. The design includes assigning the reverse link frequency to a mobile station, assigning one or more of the forward link frequencies to the reverse link frequency, and code division multiplexing a plurality of the reverse link feedback channels on the reverse link frequency.

37 Claims, 10 Drawing Sheets

(56) References Cited

U.S. PATENT DOCUMENTS

| | | | |
|---|---|---|---|
| 6,954,448 | B2 | 10/2005 | Farley et al. |
| 7,149,190 | B1 | 12/2006 | Li et al. |
| 7,154,846 | B2 | 12/2006 | Chen et al. |
| 8,064,409 | B1* | 11/2011 | Gardner et al. ............ 370/335 |
| 2001/0021180 | A1 | 9/2001 | Lee et al. |
| 2001/0055294 | A1 | 12/2001 | Motoyoshi |
| 2003/0002566 | A1 | 1/2003 | McDonough et al. |
| 2003/0067883 | A1* | 4/2003 | Azenkot et al. ............ 370/252 |
| 2003/0083093 | A1 | 5/2003 | Yun et al. |
| 2003/0092442 | A1 | 5/2003 | Dalal et al. |
| 2003/0218997 | A1 | 11/2003 | Lohtia et al. |
| 2004/0013103 | A1 | 1/2004 | Zhang et al. |
| 2004/0081111 | A1* | 4/2004 | Bae et al. ................. 370/316 |
| 2004/0233863 | A1* | 11/2004 | An et al. .................. 370/320 |
| 2005/0047344 | A1 | 3/2005 | Seol |
| 2005/0083875 | A1* | 4/2005 | Sato ........................ 370/328 |
| 2005/0090276 | A1 | 4/2005 | Rajkotia |
| 2005/0122938 | A1 | 6/2005 | Kim et al. |
| 2006/0154646 | A1* | 7/2006 | Tung ........................ 455/411 |
| 2006/0229091 | A1 | 10/2006 | Rezaiifar et al. |
| 2009/0257404 | A1* | 10/2009 | An et al. .................. 370/331 |

FOREIGN PATENT DOCUMENTS

| | | |
|---|---|---|
| JP | 2003522446 | 7/2003 |
| KR | 20020085870 | 11/2002 |
| KR | 1020030035407 | 9/2003 |
| SU | 1683027 | 10/1991 |
| WO | WO0115481 A1 | 3/2001 |
| WO | 02035735 | 5/2002 |

OTHER PUBLICATIONS

3G TS 25.211 "Physical channels and mapping of transport channels onto physical channels (FDD)", Release 5, V5.0.0, Mar. 2002. (51 pages).

3G TS 25.212 "Multiplexing and channel coding (FDD)", Release 5, V5.0.0, Mar. 2002. (74 pages).

3G TS 25.213 "Spreading and modulation (FDD)", Release 5, V5.0.0, Mar. 2002. (30 pages).

3G TS 25.214 "Physical layer procedures (FDD)", Release 5, V5.0.0, Mar. 2002. (56 pages).

3GPP TS 25.302 v3.9.0 "Services provided by the physical layer" (Release 1999). Jun. 2001. (52 pages).

3GPP2 C.S0001-0, V1.0, Jul. 1999, Introduction to cdma2000 Standards for Spread Spectrum Systems, referred to as the "cdma2000 standard", pp. 1-16.

3GPP2 TR 33.908 v3.0.0 "General Report on the Design, Specification and Evaluation of 3GPP Standard Confidentiality and Integrity Algorithms" (Release 1999). Mar. 2000. (23 pages).

EIA/TIA-IS856 CDMA2000 High Rate Packet Data Air Interface Specification refered to as the "The HDR specification", C.S0024, V3, Dec. 2001. (593 pages).

International Search Report & Written Opinion—PCT/US2006/013880, International Searching Authority—European Patent Office—Oct. 17, 2006.

Jou, Y.: "Developments in Third Generation (3G) CDMA Technology" Spread Spectrum Techniques and Applications, 2000 IEEE Sixth International Symposium on Sep. 6-8, 2000, Piscataway, NJ, USA, IEEE vol. 1, Sep. 6, 2000, pp. 460-464.

Knisely, D.N., et al. CDMA 2000: "A Third-Generation Radio Transmission Technology," Bell Labs Technical Journal, Bell Laboratories, US. vol. 3, No. 3, Jul. 1, 1998, pp. 63-78.

Sarikaya, Behcet et al: "Packet Mode in Wireless Networks: Overview of Transition to Third Generation" IEEE Communications Magazine, IEEE Service Center, Piscataway, US, vol. 38, No. 9, Sep. 2000, pp. 164-172.

Taiwanese search Report—TW095112543—SearchAuthority—TIPO—May 20, 2009.

Taiwan Search Report—TW098133639—TIPO—Nov. 28, 2012.

* cited by examiner

| BIT | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| $MI_{RTCMAC}$ | | | | | | | | | | | | | | | | | | | | | | | | | | | | | | | | | 1 | 1 | 1 | 1 | 1 | 1 | | | | |
| | Permuted (ATI) | | | | | | | | | | | | | | | | | | | | | | | | | | | | | | | | | | | | | | IDX | | | |

4 MSBs of FeedbackMultiplexing Index, IDX

FIG. 3

| Field | Length (bits) |
|---|---|
| MessageID | 8 |
| MessageSequence | 8 |
| DSCChannelGainBase | 5 |
| FrameOffset | 4 |
| NumSectors | 3 |
| NumSubActiveSets | 4 |
| AssignedChannelIncluded | 1 |
| SchedulerTagIncluded | 1 |
| FeedbackMultiplexingEnabled | 1 |

NumPilots occurrences of the following record:
{0

| Field | Length (bits) |
|---|---|
| RAChannelGain | 2 |
| PilotPN | 9 |
| DRCCover | 3 |
| SofterHandoff | 1 |

}0

N occurences of the following field, where N is the number of SofterHandoff fields set to '0' in this message

| Field | Length (bits) |
|---|---|
| DSC | 3 |

NumSubActiveSets occurrences of the following SubActiveParameters record (starting from NumFwdChannelsThisSubActiveSet and ending at RABMAIndex, inclusive):
{0

| Field | Length (bits) |
|---|---|
| NumFwdChannelsThisSubActiveSet | 4 |

NumFwdChannelsThisSubActiveSet occurrences of the following field:
{1

| Field | Length (bits) |
|---|---|
| AssignedChannel | 0 or 24 |

}1

| Field | Length (bits) |
|---|---|
| FeedbackEnabled | 1 |
| FeedbackMultiplexingIndex | 0 or 9 |
| FeedbackReverseChannelIndex | 0 or 4 |
| SubActiveSetCArriesControlChannel | 1 |
| ThisSubActiveSetNotReportable | 1 |
| DSCForThisSubActiveSetEnabled | 0 or 1 |
| Next3FieldsSameAsBefore | 0 or 1 |

FIG. 6A

| | |
|---|---|
| DRCLength | 0 or 2 |
| DRCChannelGainBase | 0 or 6 |
| ACKChannelGain | 0 or 6 |
| NumReverseChannelsIncluded | 1 |
| NumReverseChannels | 0 or 4 |

NumReverseChannels occurrences of the following record:
{1

| | |
|---|---|
| ReverseChannelConfiguration | 0 or 2 |
| ReverseBandClass | 0 or 5 |
| ReverseChannelNumber | 0 or 11 |
| ReverseChannelDroppingRank | 0 or 3 |

}1
NumSectors occurrences of the following record:
{1

| | |
|---|---|
| PilotInThisSectorIncluded | 1 |
| ForwardChannelIndexThisPilot | 0 or 4 |
| PilotGroupID | 0 or 3 |
| NumUniqueForwardTrafficMACIndices | 0 or 3 |
| SchedulerTag | 0 or 7 |
| AuxDRCCoverIncluded | 0 or 1 |
| AuxDRCCover | 0 or 3 |
| ForwardTrafficMACIndexPerInterlaceEnabled | 0 or 1 |

NumUniqueForwardTrafficMACIndices (if included) or zero occurrences of the following record:
{2

| | |
|---|---|
| ForwardTrafficMACIndex | 0 or 10 |
| AssignedInterlaces | 0 or 4 |

}2
NumReverseChannels occurrences of the following record:
{2

| | |
|---|---|
| ReverseLinkMACIndex | 0 or 9 |
| RABMACIndex | 0 or 7 |

}2
}1
}0

| | |
|---|---|
| Reserved | Variable |

FIG. 6B

MULTIPLEXING ON THE REVERSE LINK FEEDBACKS FOR MULTIPLE FORWARD LINK FREQUENCIES

CLAIM OF PRIORITY UNDER 35 U.S.C. §§119 AND 120

The present Application for Patent is a divisional of patent application Ser. No. 11/397,873, titled "Multiplexing on the Reverse Link Feedbacks for Multiple Forward Link Frequencies" filed Apr. 3, 2006, pending, which claims priority to Provisional Application No. 60/669,437, titled "Multiplexing on the Reverse Link Feedbacks for Multiple Forward Link Frequencies" filed Apr. 8, 2005, expired, and assigned to the assignee hereof, and expressly incorporated herein by reference.

FIELD

The present invention pertains generally to communications, and more specifically to multiplexing feedback information in a multiple carrier communication system.

BACKGROUND

There is a recent interest in multicarrier transmission systems, wherein multiple frequencies are used for transmission channels.

SUMMARY OF THE INVENTION

In view of the above, the described features of the present invention generally relate to one or more improved systems, methods and/or apparatuses for communicating speech.

In one embodiment, the present method comprises a method for multiplexing reverse link feedback channels on a single reverse link frequency supporting multiple forward link frequencies for forward link channels, comprising assigning the reverse link frequency to a mobile station, assigning one or more of the forward link frequencies to the reverse link frequency, and code division multiplexing a plurality of the reverse link feedback channels on the reverse link frequency.

In another embodiment, the present apparatus comprises a communication apparatus configured to multiplex reverse link feedback channels on a single reverse link frequency supporting multiple forward link frequencies for forward link channels, comprising a transmitter, a receiver operably connected to the transmitter, a processor operably connected to the transmitter and the receiver, and memory operably connected to the processor, wherein the communication apparatus is adapted to execute instructions stored in the memory comprising assigning the reverse link frequency to a mobile station, assigning one or more of the forward link frequencies to the reverse link frequency, and code division multiplexing a plurality of the reverse link feedback channels on the reverse link frequency.

Further scope of the applicability of the present method and apparatus will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein:

FIG. 3 illustrates generation of Feedback Multiplexing Mask according to one embodiment;

FIGS. 6A and 6B illustrate a traffic channel assignment message;

DETAILED DESCRIPTION OF THE INVENTION

Figure 1A:
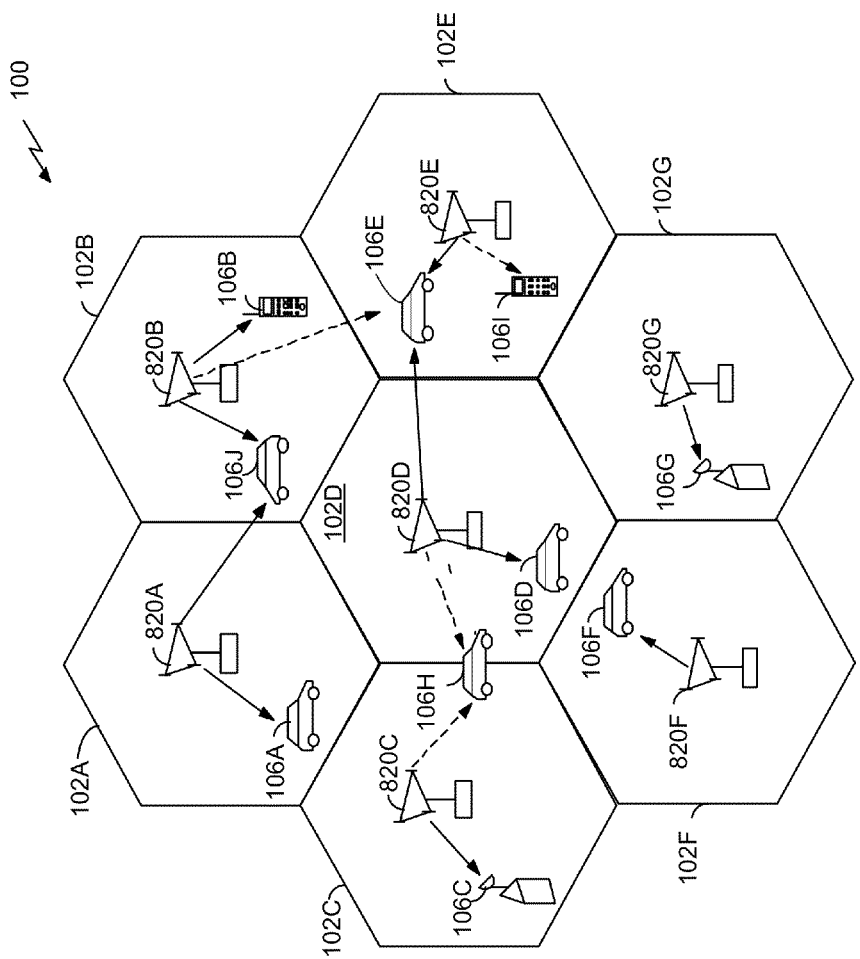
FIG. 1A is a wireless communication system.

Communication systems, and wireless systems in particular, are designed with the objective of efficient allocation of resources among a variety of users. Wireless systems in particular aim to provide sufficient resources to satisfy the requirements of all subscribers while minimizing costs. Various scheduling algorithms have been developed, each based on a predetermined system criteria.

In a wireless communication system employing a code division-multiple access (CDMA) protocol, one scheduling method assigns each of the subscriber units all code channels at designated time intervals on a time multiplexed basis. A central communication node, such as a base station (BS) implements the unique carrier frequency or channel code associated with the subscriber to enable exclusive communication with the subscriber. Time division multiple access (TDMA) protocols may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard.

The CDMA system allows for voice and data communications between users over a terrestrial link. In a CDMA system, communications between users are conducted through one or more base stations. In wireless communication systems, forward link (FL) refers to the channel through which signals travel from a base station to a subscriber station, and reverse link (RL) refers to channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial Internet through a connection with a serving base station. In wireless communications such as those conforming to the IS-95 standard, forward link and reverse link signals are transmitted within disjoint frequency bands.

At any given time, each base station may be expected to maintain concurrent wireless communication links with numerous mobile units. To reduce interference between the concurrent wireless communication links, the base station and the mobile units in the wireless communication system modulate signals transmitted on the assigned traffic channels using a predetermined Pseudo-random Noise PN code that uniquely identifies the mobile unit. Thus, the mobile is distinguished from other mobiles by its long PN code which may be generated by a long code mask. In IS-95 CDMA, PN code sets are generated using linear feedback shift registers (LFSR).

In a wireless communication system operating according to the CDMA 2000 standard, a long code mask may also be used to differentiate reverse link transmissions, i.e. from the mobile unit to the base station, over different traffic channels. The long code mask in CDMA 2000 is a 42-bit number that serves as a logical address for Reverse CDMA Channel spreading codes. It is used to select specific bits from the long code linear feedback shift register to be added, modulo-two, in order to produce the actual long PN code, at the proper phase. The resultant of the sum, that is, the modulo-2 inner product of the generator state with the mask, is the generator output, or PN code, corresponding to that mask and is used to identify a particular access terminal or mobile station. The use of this 42-bit distinct user long code sequence allows separation of $2^{42-1}$ different user (or mobile) signals at the base station.

FIG. 1A serves as an example of a communications system 100 that supports a number of users and is capable of implementing at least some aspects and embodiments of the invention. The communication system 100 comprises a number of communication apparatuses. Any of a variety of methods may be used to schedule transmissions in system 100. System 100 provides communication for a number of cells 102A through 102G, each of which is serviced by a corresponding base station 820A through 820G, respectively. In the exemplary embodiment, some of base stations 820 have multiple receive antennas and others have only one receive antenna. Similarly, some of base stations 820 have multiple transmit antennas, and others have single transmit antennas. There are no restrictions on the combinations of transmit antennas and receive antennas. Therefore, it is possible for a base station 820 to have multiple transmit antennas and a single receive antenna, or to have multiple receive antennas and a single transmit antenna, or to have both single or multiple transmit and receive antennas.

Increasing demand for wireless data transmission and the expansion of services available via wireless communication technology have led to the development of specific data services. One such service is referred to as High Data Rate (HDR). An exemplary HDR service is proposed in "EIA/TIA-IS856 Cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a useful resource.

Figure 1B:
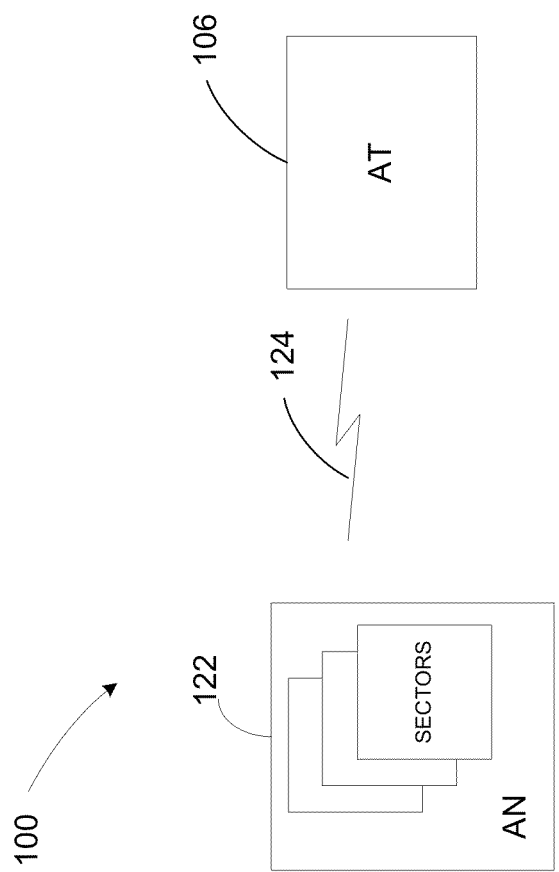
FIG. 1B is a wireless communication system supporting high data rate transmissions.
Figure 2:
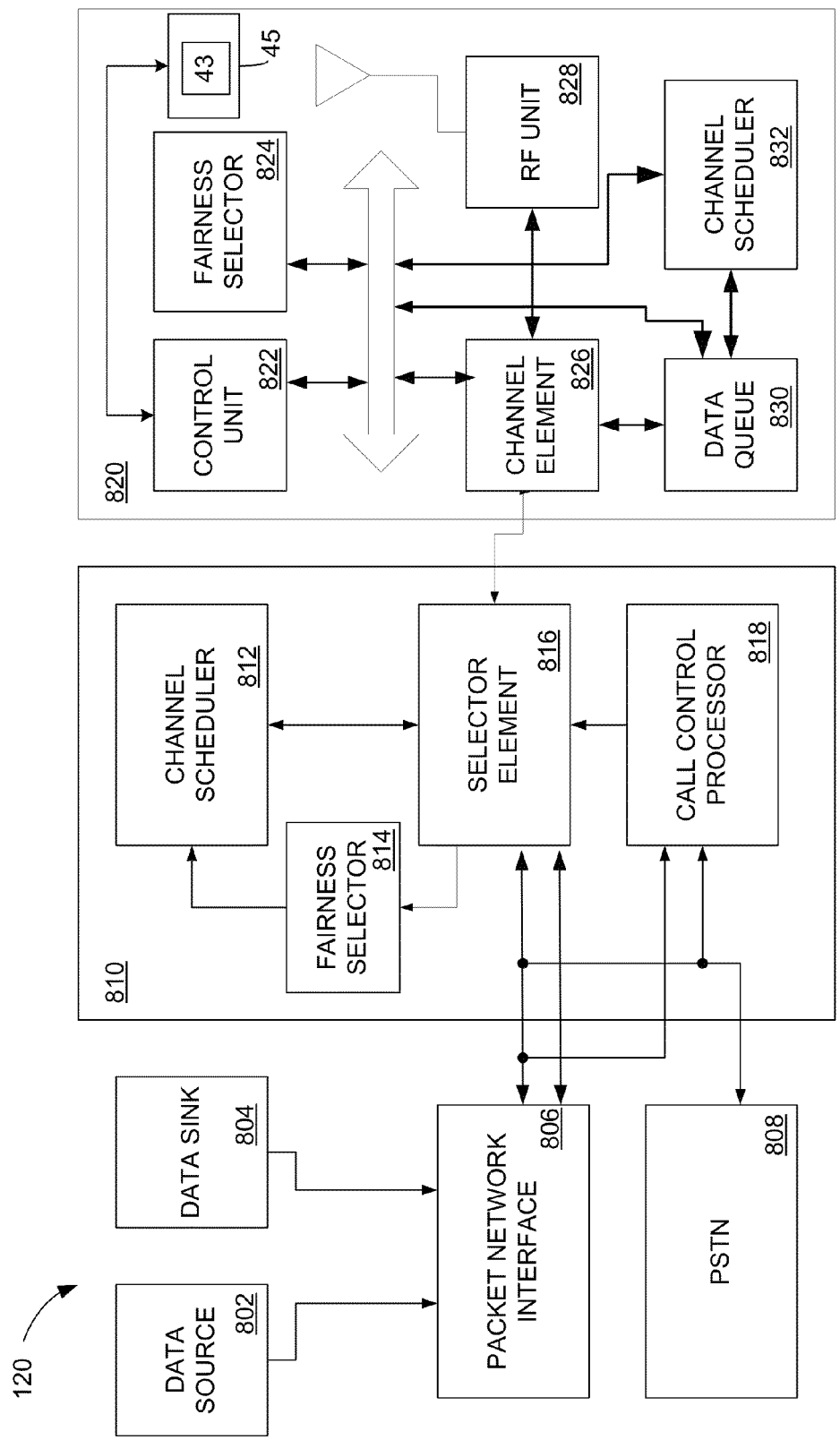
FIG. 2 is a block diagram of an Access Network (AN) in a wireless communication system.

FIG. 1B illustrates an architecture reference model for a communication system 100 having an access network 122 communicating with an access terminal (AT), 106 via an air interface 124. An access network 122 is defined as network equipment which provides data connectivity between a packet switched data network (typically the Internet) and one or more access terminals 106. An access terminal 106 is equivalent to a mobile station or a remote station and provides data connectivity to a user. In one embodiment, the system 120 is a CDMA system having a High Data Rate, HDR, overlay system, such as specified the HDR standard. The AN 122 communicates with AT 106, as well as any other ATs 106 within system 120 (not shown), by way of the air interface 124. The AN 122 includes multiple sectors, wherein each sector provides at least one channel. A channel is defined as the set of communication links for transmissions between the AN 122 and the ATs within a given frequency assignment. A channel consists of a forward link for transmissions from a base station 820 in the AN 122 to AT 106 and a reverse link for transmissions from the AT 106 to the BS 820 in the AN 122. The BS 820 is operably connected to a base station controller (BSC) 810 as illustrated in FIG. 2.

For data transmissions, the AN 122 receives a data request from the AT 106. The data request specifies the data rate at which the data is to be sent, the length of the data packet transmitted, and the sector from which the data is to be sent. The AT 106 determines the data rate based on the quality of the channel between AN 122 and AT 106. In one embodiment the quality of the channel is determined by the carrier-to-interference ratio (C/I). Alternate embodiments may use other metrics corresponding to the quality of the channel. The AT 106 provides requests for data transmissions by sending a data rate control (DRC) message via a specific channel referred to as the DRC channel. The DRC message includes a data rate portion and a sector portion. The data rate portion indicates the requested data rate for the AN 122 to send the data, and the sector indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 122 via the air interface 124. In one embodiment, each DRC value corresponds to a data rate in kbits/sec having an associated packet length according to a predetermined DRC value assignment. The assignment includes a DRC value specifying a null data rate. In practice, the null data rate indicates to the AN 122 that the AT 106 is not able to receive data. In one situation, for example, the quality of the channel is insufficient for the AT 106 to receive data accurately.

In operation, the AT 106 continuously monitors the quality of the channel to calculate a data rate at which the AT 106 is able to receive a next data packet transmission. The AT 106 then generates a corresponding DRC value; the DRC value is transmitted to the AN 122 to request a data transmission. Note that typically data transmissions are partitioned into packets. The time required to transmit a packet of data is a function of the data rate applied.

This DRC signal also provides the information, which a channel scheduler 812 uses to determine the instantaneous rate for consuming information (or receiving transmitted data) for each of the remote stations 106 associated with each queue. According to an embodiment, a DRC signal transmitted from any remote station 106 indicates that the remote station 106 is capable of receiving data at any one of multiple effective data rates.

One example of a communication system supporting HDR transmissions and adapted for scheduling transmissions to multiple users is illustrated in FIG. 2. FIG. 2 is detailed hereinbelow, wherein specifically, a base station 820 and base station controller (BSC) 810 interface with a packet network interface 806. Base station controller 810 includes a channel scheduler 812 for implementing a scheduling algorithm for transmissions in system 120. The channel scheduler 812 determines the length of a service interval during which data is to be transmitted to any particular remote station 106 based upon the remote station's associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data $R_i$ determines the service interval length $L_i$ associated with a particular data queue.

In addition, the channel scheduler 812 selects the particular data queue for transmission. The associated quantity of data to be transmitted is then retrieved from a data queue 830 and provided to the channel element 826 for transmission to the remote station 106 associated with the data queue 830. As discussed below, the channel scheduler 812 selects the queue for providing the data, which is transmitted in a following service interval using information including the weight associated with each of the queues. The weight associated with the transmitted queue is then updated.

Base station controller 810 interfaces with packet network interface 806, Public Switched Telephone Network, PSTN, 808, and all base stations 820 in the communication system (only one base station 820 is shown in FIG. 2 for simplicity). Base station controller 810 coordinates the communication between remote stations in the communication system and other users connected to packet network interface 806 and PSTN 808. PSTN 808 interfaces with users through a standard telephone network (not shown in FIG. 2).

Base station controller 810 contains many selector elements 816, although only one is shown in FIG. 2 for simplicity. Each selector element 816 is assigned to control communication between one or more base stations 820 and one remote station 106 (not shown). If selector element 816 has not been assigned to a given remote station 106, call control processor 818 is informed of the need to page the remote station 106. Call control processor 818 then directs base station 820 to page the remote station 106.

Data source 802 contains a quantity of data, which is to be transmitted to a given remote station 106. Data source 802 provides the data to packet network interface 806. Packet network interface 806 receives the data and routes the data to the selector element 816. Selector element 816 then transmits the data to each base station 820 in communication with the target remote station 106. In the exemplary embodiment, each base station 820 maintains a data queue 830, which stores the data to be transmitted to the remote station 106.

The data is transmitted in data packets from data queue 830 to channel element 826. In the exemplary embodiment, on the forward link, a "data packet" refers to a quantity of data which is a maximum of 1024 bits and a quantity of data to be transmitted to a destination remote station 106 within a predetermined "time slot" (such as 1.667 msec). For each data packet, channel element 826 inserts the necessary control fields. In the exemplary embodiment, channel element 826 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 826 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 828 which quadrature modulates, filters, and amplifies the signal. The forward link signal is transmitted over the air through an antenna to the forward link.

At the remote station 106, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 820, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 830 varies to accommodate changes in signal strength and the noise environment at the remote station 106. Each of the remote stations 106 preferably transmits a data rate control signal to an associated base station 820 at each time slot. The DRC signal provides information to the base station 820, which includes the identity of the remote station 106 and the rate at which the remote station 106 is to receive data from its associated data queue. Accordingly, circuitry at the remote station 106 measures the signal strength and estimates the noise environment at the remote station 106 to determine the rate information to be transmitted in the DRC signal.

The DRC signal transmitted by each remote station 106 travels through a reverse link channel and is received at base station 820 through a receive antenna coupled to RF unit 828. In the exemplary embodiment, the DRC information is demodulated in channel element 826 and provided to a channel scheduler 812 located in the base station controller 810 or to a channel scheduler 832 located in the base station 820. In a first exemplary embodiment, the channel scheduler 832 is located in the base station 820. In an alternate embodiment, the channel scheduler 812 is located in the base station controller 810, and connects to all selector elements 816 within the base station controller 810.

For multicarrier transmissions, data is transmitted by dividing the data into several interleaved bit streams and using these to modulate several carriers. Multicarrier transmission is a form of frequency division multiplexing. In a CDMA communication system, multicarrier transmission is used to suppress multipath fading.

In a communication system employing multicarrier transmissions, it may be the situation that the number of forward link channels is greater than the number of reverse link channels. In this situation, there is a need to transmit multiple RL channels, corresponding to the multiple FL channels, on a single RL frequency. The RL channels may be channels used for feedback of information. In one example, such a RL channel is the DRC channel as specified in IS-856; in another example, such a RL channel is an ACKnowledge (ACK) channel used for Automatic Repeat reQuest (ARQ) feedback. According to one embodiment, the RL overhead channels are multiplexed together on a single RL frequency, wherein a long code mask (LCM) is used to code multiplex the overhead channels. Thus, the RL overhead channels used for the ACK channel and the DRC channel respectively are separated by code division multiplexing using the long code mask.

The AN 122 may assign one or more long code masks to the AT 106 for each of the RL feedback channels on which the access terminal 106 may transmit. The long code mask for each of the RL feedback channels is identified by the value of a feedback multiplexing index which is provided by a route update protocol. A route update protocol provides the means to maintain the route between the access terminal 106 and the access network 122.

In one embodiment, the AT 106 may set the long code for each channel on the RL using the 42-bit mask $MI_{RTCMAC}$ illustrated in FIG. 3. $MI_{RTCMAC}$ is the long code mask for the in-phase reverse traffic channel (or reverse link). $MQ_{RTCMAC}$ is the long code mask for the quadrature-phase reverse traffic channel (or reverse link), where the reverse traffic channel may consist of a pilot channel, a reverse rate indicator (RRI) channel, a DRC channel, an ACK channel and a data channel. As illustrated in FIG. 3, the LCM includes four bits, 38, 39, 40 and 41, that represent the binary index field labeled IDX. However, the values of the bits in field IDX can vary to produce different long code masks (LCM).

Also shown in FIG. 3, the long code mask contains a 32-bit ATI number (referred to as the Permuted (ATI) field which is derived from the AT's 106 access terminal identifier (ATI) as shown, for example, below in equation 2. An ATI derived number is derived from the identifier of the access terminal 106. It is derived from the bits representing the identifier of the access terminal 106.

According to one embodiment, three additional long code masks are created for each RL carrier feedback channel by changing the two most significant bits (MSBs) of the LCM, while keeping the 32-bit Permuted ATI field the same. For example, if the two most significant bits of the LCM for one FL ACK channel carried on RL carrier frequency "x" is 00, then three other LCMs may be created to represent three additional FL carrier frequencies whose DRC or ACK channels are transmitted on RL carrier frequency x by setting the two most significant bits to 01, 10, and 11. (However, it is noted that the present patent application is not limited to changing two bits. In other embodiments, three or more bits may be changed to create additional LCMs. For example, FIG. 3 shows the four MSBs 38-41 as having variable values.

Thus, using the LCM of FIG. 3 as an example, bits 40 and 41 would take on the three values 01, 10 and 11, while the 32 bits in the ATI field would not change their value, to identify three additional LCMs. This is illustrated when the first 4 LCMs represented by feedback multiplexing indexes 0 to 3, have an identical value in their ATI field and differ in their IDX field by the first two bits, 00, 10, 01, and 11. The LCM with MSBs of 00 could represent the DRC channel of FL frequency "a," while the LCM with MSBs of 01 could represent the DRC channel of FL frequency "b." Likewise, the LCM with MSBs of 10 could represent the ACK channel of FL frequency "a," while the LCM with MSBs of 11 could represent the ACK channel of FL frequency "b."

As shown in FIG. 3, part of the long code mask is derived from the access terminal's identifier. If more than one identifier is assigned to the access terminal, additional long code masks can be derived for the terminal For example, additional LCMs may be created by the AN 122 reserving the value of ATIs (i.e., not assigning them to other ATs 106) and by the AT 106 using the ATI values to construct the 32 least significant bits (LSBs) of the LCM as described herein. In one example, three additional ATIs would allow for construction of a total of 16 long code masks.

Figure 4:
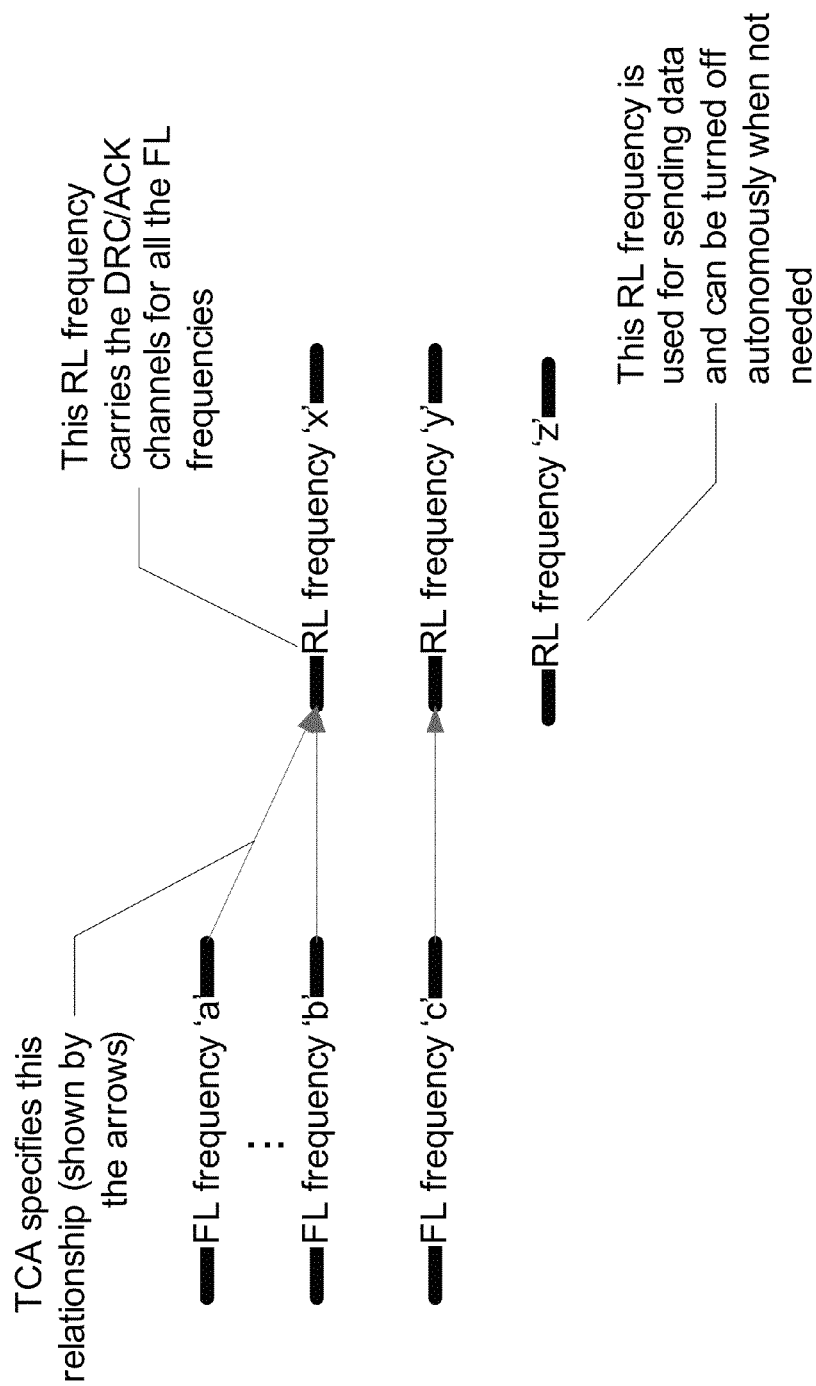
FIG. 4 illustrates multiplexing of reverse link frequencies in a multicarrier communication system.

In a communication system employing multicarrier transmissions, it may be the situation that the number of forward link channels is equal to the number of reverse link channels. In this situation it is desirable to allow the mobile 106 to turn off transmission of the pilot and data signals on certain RL frequencies, i.e., turn off the RL frequency. This allows the access terminal 106 to conserve transmission power headroom. Such control of transmission (i.e., turn on/off) may be done autonomously by the access terminal 106. FIG. 4 illustrates the relationship of multiplexed RL frequencies to the multicarrier FL frequencies.

Figure 5:
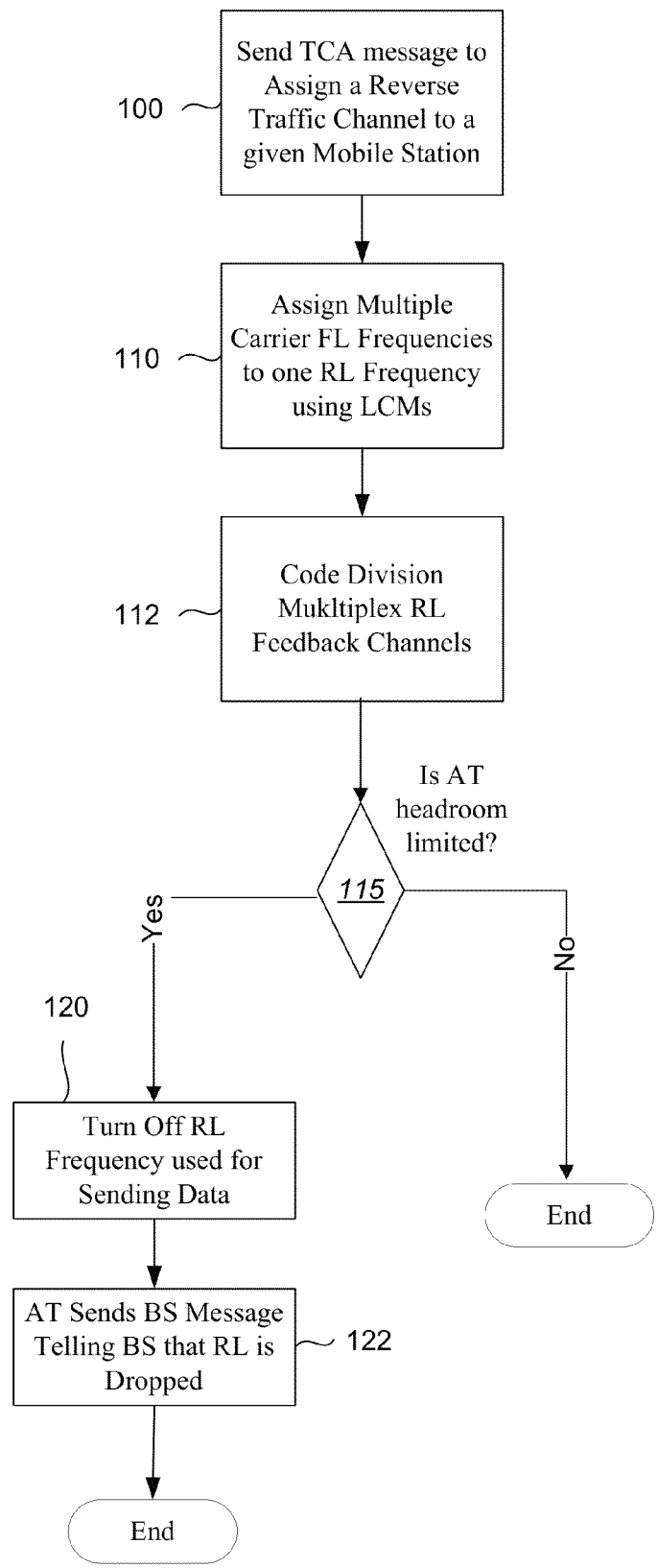
FIG. 5 is a flowchart illustrating the steps executed when multiplexing reverse link frequencies in a multicarrier communication system.

In one embodiment shown in the flowchart of FIG. 5, a traffic channel assignment (TCA) message is sent by a base station 820 to assign a reverse traffic channel or reverse link to a given mobile station 106, i.e., access terminal (step 100).

The traffic channel assignment message, as illustrated in FIGS. 6A and 6B, includes a Frame Offset field, a Pilot Pseudo-random Noise Code (Pilot PN) information field, and a MAC Index field as forward traffic channel information, and includes a DRC (Data Rate Control) information Length field, a DRC Channel Gain Base field, an ACK Channel Gain field, a DRC Cover Code field, a Number of Sectors field, and a Number of Reverse Active Sets field. It also contains a Message Id field, a Message Sequence field, an Assigned Channel Included field, a Scheduler Tag Included field, a Feedback Multiplexing Enabled field, a Softer Handoff field, a DSC field, a DSC Channel Gain Base field, a RA Channel Gain field, a Number of Forward Channels This Sub Active Set field, and a Reserved field.

The TCA message also includes an Assigned Channel field, a Feedback Enabled field, a Feedback Multiplexing Index field, a Feedback Reverse Channel Index field, a Sub Active Set Carrier Control Channel field, a This Sub Active Set Not Reportable field, a DSC For This Sub Active Set Enabled field, and a Next 3 Fields Same as Before field.

In addition, the TCA message includes a Number Reverse Channels Included field, a Number Reverse Channels field, a Reverse Channel Configuration field, a Reverse Band Class field, a Reverse Channel Number field, a Reverse Channel Dropping Rank field, a Pilot This Sector Included field, a Forward Channel Index This Pilot field, a Pilot Group ID field, a Numbers Unique Forward Traffic MAC Indices field, a Scheduler Tag field, an Auxiliary DRC Cover Included field, an Auxiliary DRC Cover field, a Forward Traffic MAC Index Per Index Enabled field, an Assigned Interlaces field, a Reverse Link MAC index field, and a RAB MAC Index field.

The TCA message represents an improvement over the prior art in that it further specifies the relationships detailed in FIG. 4. In one embodiment, the TCA message conveys the feedback multiplexing index to the mobile 106. As illustrated in the example of FIG. 4 (and the flowchart of FIG. 5) the mobile station 106 then uses the TCA message to assign multiple carrier FL frequencies "a" through "b" to one RL frequency "x." (Step 110) The RL frequency x is then used for transmission of feedback and/or overhead information corresponding to one or more of the FL frequencies a through b.

Next, the corresponding information, e.g. RL feedback channels DRC and ACK, is code division multiplexed on the single RL frequency "x" by using different long code masks for each. (Step 112) For example, the DRC channel for FL carrier frequency "a" is assigned a long code mask represented by feedback multiplexing index 0 on RL carrier "x", while the DRC channel for FL carrier frequency "b" is assigned a long code mask represented by feedback multiplexing index "1" on RL carrier x. Likewise, the ACK channel for FL carrier frequency "a" is assigned a long code mask represented by feedback multiplexing index "2" on RL carrier "x", while the ACK channel for FL carrier frequency "b" is assigned a long code mask represented by feedback multiplexing index "3" on RL carrier x.

In the example of FIG. 4, the RL frequency "z" used for sending data or traffic may be autonomously turned off (i.e., no transmissions at this frequency) to conserve headroom. Thus, a way to conserve headroom is, as stated above, to allow the mobile 106 to turn off transmission on certain RL frequencies. Is AT 106 headroom limited? (Step 115) If the answer to step 115 is yes, then turn off RL frequency "z" used for sending data. (Step 120). In addition, the AT 106 sends a message to the BS 820 telling the BS 820 that it has dropped the RL (Step 122).

Also shown in FIG. 4, the base station 820 may assign only one of the multiple carrier FL frequencies, "c", to one RL frequency "y." The RL feedback channels DRC and ACK for FL frequency "c" may be code division multiplexed on the single RL frequency "y" by using different long code masks for each. For example, the DRC channel for FL carrier frequency "c" is assigned long code mask 0 on RL carrier "y", while the DRC channel for FL carrier frequency "b" is assigned the long code mask represented by feedback multiplexing index "1" on RL carrier "y."

Permuted (ATI) is defined as follows:

$$ATI=(A_{31}, A_{30}, A_{29}, \ldots, A_0) \quad (1)$$

$$\begin{aligned}\text{Permuted (ATI)}=(&A_0, A_{31}, A_{22}, A_{13}, A_4, A_{26}, A_{17}, A_8, A_{30},\\ &A_{21}, A_{12}, A_3, A_{25}, A_{16}, A_7, A_{29}, A_{20}, A_{11}, A_2, A_{24},\\ &A_{15}, A_6, A_{28}, A_{19}, A_{10}, A_1, A_{23}, A_{14}, A_5, A_{27}, A_{18}, A_9). \end{aligned} \quad (2)$$

The 42-bit mask $MQ_{RTCMAC}$ is derived from the mask $MI_{RTCMAC}$ as follows:

$$MQ_{RTCMAC}[k]=MI_{RTCMAC}[k-1], \text{ for } k=1, \ldots, 41 \quad (3)$$

$$\begin{aligned}MQ_{RTCMAC}[0]=&MI_{RTCMAC}[0] \oplus MI_{RTCMAC}[1] \oplus\\ &MI_{RTCMAC}[2] \oplus MI_{RTCMAC}[4] \oplus MI_{RTCMAC}[5] \oplus\\ &MI_{RTCMAC}[6] \oplus MI_{RTCMAC}[9] \oplus MI_{RTCMAC}[15] \oplus\\ &MI_{RTCMAC}[16] \oplus MI_{RTCMAC}[17] \oplus MI_{RTCMAC}\\ &[18] \oplus MI_{RTCMAC}[20] \oplus MI_{RTCMAC}[21] \oplus\\ &MI_{RTCMAC}[24] \oplus MI_{RTCMAC}[25] \oplus MI_{RTCMAC}\\ &[26] \oplus MI_{RTCMAC}[30] \oplus MI_{RTCMAC}[32] \oplus\\ &MI_{RTCMAC}[34] \oplus MI_{RTCMAC}[41]\end{aligned} \quad (4)$$

wherein the operator $\oplus$ denotes the Exclusive OR operation, and $MQ_{RTCMAC}[i]$ and $MI_{RTCMAC}[i]$ denote the $i^{th}$ least significant bit of $MQ_{RTCMAC}$ and $MI_{RTCMAC}$, respectively.

Figure 7:
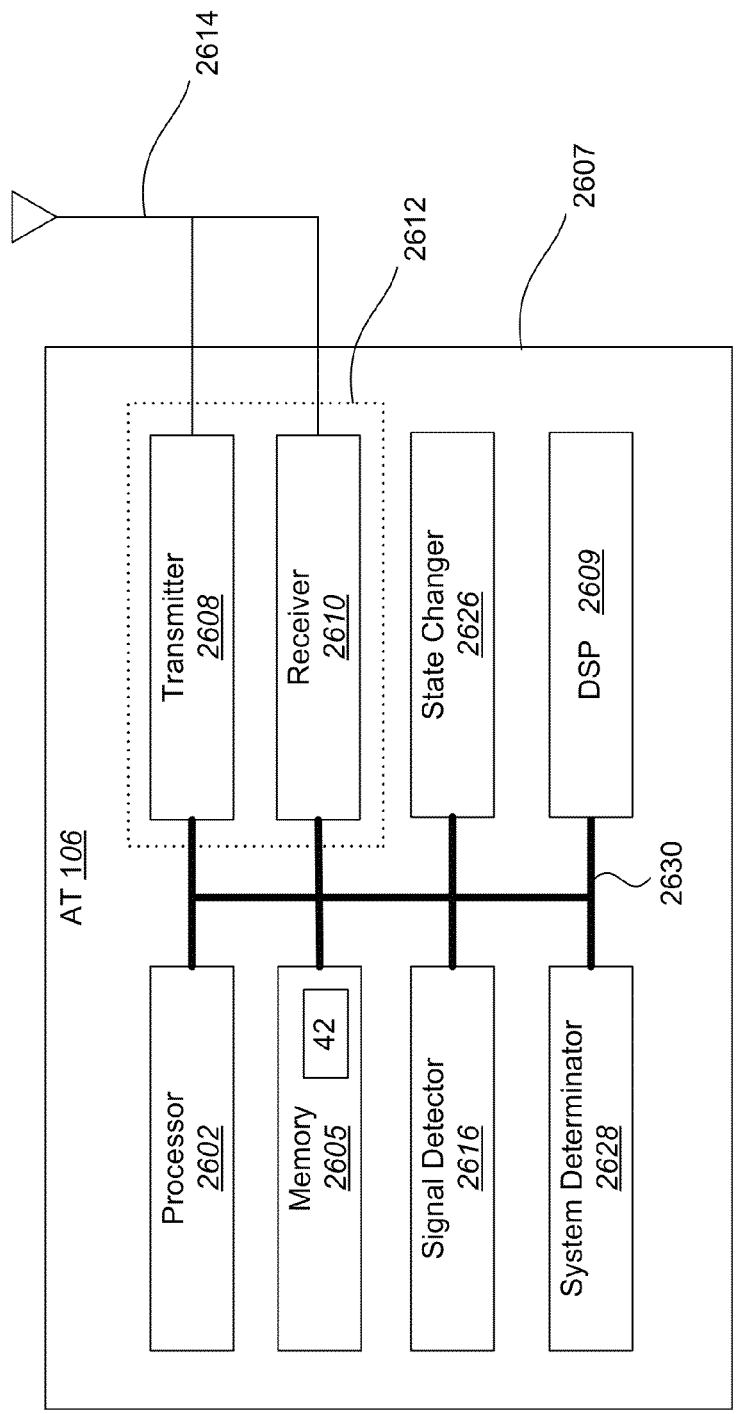
FIG. 7 is a functional block diagram illustrating an embodiment of an access terminal.

FIG. 7 is a functional block diagram illustrating an embodiment of an AT 106. The AT 106 includes a processor 2602 which controls operation of the AT 106. The processor 2602 may also be referred to as a CPU. Memory 2605, which may include both read-only memory (ROM) and random access memory (RAM), provides instructions and data to the processor 2602. A portion of the memory 2605 may also include non-volatile random access memory (NVRAM). The steps illustrated in FIGS. 4 and 5 and the LCM illustrated in FIG. 3 may be stored as instructions located as software or firmware 42 located in memory 2605. These instructions may be executed by the processor 2602.

The AT 106, which may be embodied in a wireless communication device such as a cellular telephone, may also include a housing 2607 that contains a transmitter 2608 and a receiver 2610 to allow transmission and reception of data, such as audio communications, between the AT 2606 and a remote location, such as an AN 122. The transmitter 2608 and receiver 2610 may be combined into a transceiver 2612. An antenna 2614 is attached to the housing 2607 and electrically coupled to the transceiver 2612. Additional antennas (not shown) may also be used. The operation of the transmitter 2608, receiver 2610 and antenna 2614 is well known in the art and need not be described herein.

The AT 106 also includes a signal detector 2616 used to detect and quantify the level of signals received by the transceiver 2612. The signal detector 2616 detects such signals as total energy, pilot energy per pseudonoise (PN) chips, power spectral density, and other signals, as is known in the art.

A state changer 2626 of the AT 106 controls the state of the wireless communication device based on a current state and additional signals received by the transceiver 2612 and detected by the signal detector 2616. The wireless communication device is capable of operating in any one of a number of states.

The AT 106 also includes a system determinator 2628 used to control the wireless communication device and determine which service provider system the wireless communication device should transfer to when it determines the current service provider system is inadequate.

The various components of the AT 106 are coupled together by a bus system 2630 which may include a power bus, a control signal bus, and a status signal bus in addition to a data bus. However, for the sake of clarity, the various busses are illustrated in FIG. 7 as the bus system 2630. The AT 106 may also include a digital signal processor (DSP) 2609 for use in processing signals. One skilled in the art will appreciate that the AT 106 illustrated in FIG. 7 is a functional block diagram rather than a listing of specific components.

Figure 8:
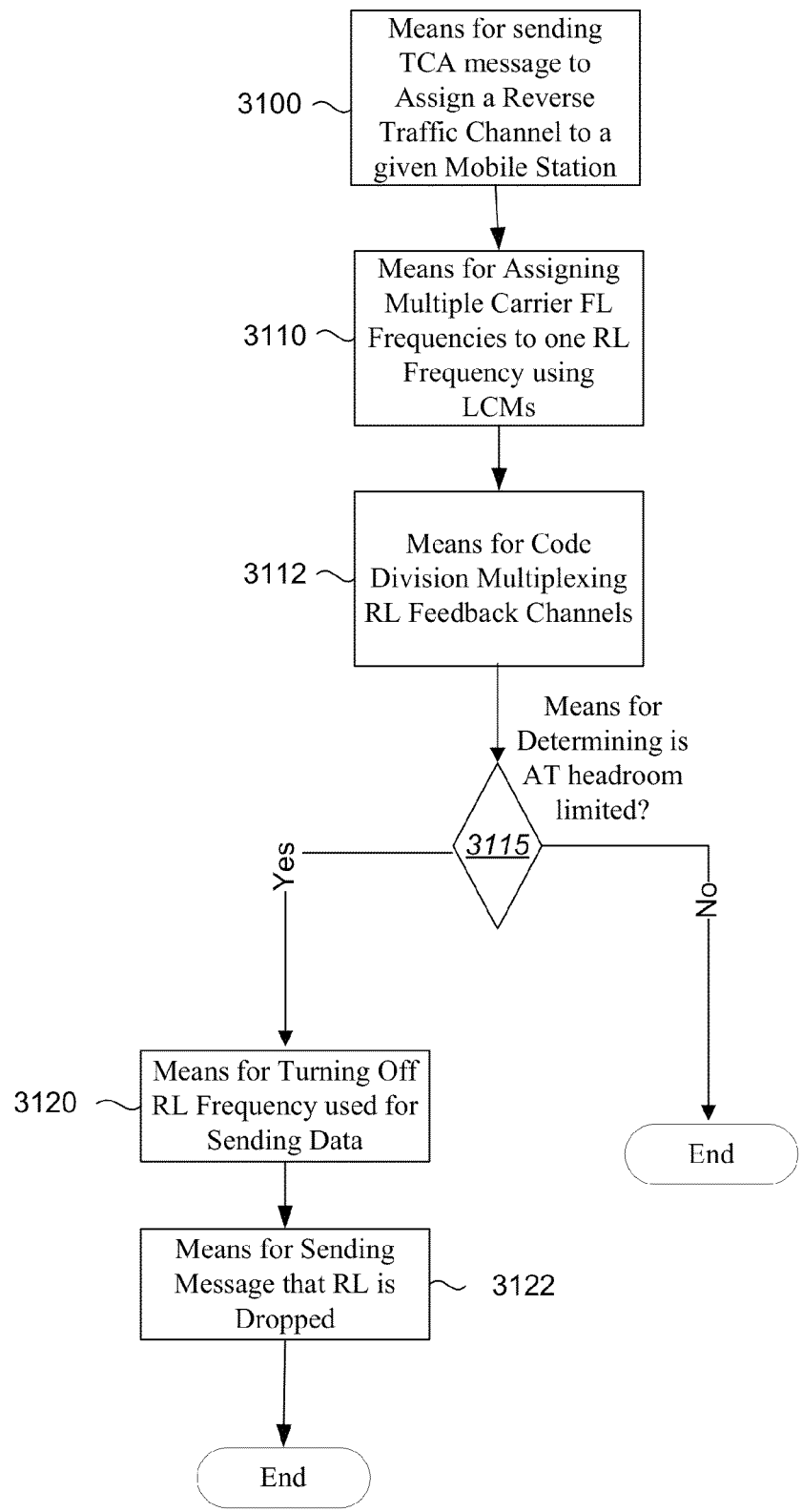
FIG. 8 is a functional block diagram illustrating the multiplexing of reverse link frequencies in a multicarrier communication system.

The methods and apparatuses of FIG. 5 described above are performed by corresponding means plus function blocks illustrated in FIG. 8. In other words, steps 100, 110, 112, 115, 117, 120 and 122 in FIG. 5 correspond to means plus function blocks 3100, 3110, 3112, 3115, 3120 and 3122 in FIG. 8.

The steps illustrated in FIGS. 4 and 5 and the long code mask illustrated in FIG. 3 may be also be stored as instructions located as software or firmware 43 located in memory 45 in the base station 820. These instructions may be executed by a processor or processing means such as control unit 822 as shown in FIG. 2.

Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for wireless communication, comprising:
   receiving a set of long code masks at a mobile station, wherein each long code mask in the set of long code masks includes a multiple bit feedback multiplexing index correlating one forward link channel on one forward link frequency with one reverse link frequency;
   receiving a channel assignment message at the mobile station, the channel assignment message assigning a first reverse link frequency to the mobile station and specifying relationships between a plurality of forward link frequencies and at least one reverse link frequency;
   assigning a first long code mask to a first frequency of a forward link channel according to a first multiple bit feedback multiplexing index and assigning a second long code mask to a second frequency of the forward link channel according to a second multiple bit feedback multiplexing index;
   multiplexing the first frequency of the forward link channel to the first reverse link frequency using the first long code mask and the second frequency of the forward link channel to the first reverse link frequency using the second long code mask; and
   turning off a second reverse link frequency that the mobile station is configured to employ for sending data.

2. The method according to claim 1, wherein said at least two channels comprise an acknowledge channel and a data rate control channel.

3. The method according to claim 1, wherein said at least two channels are code division multiplexed.

4. The method according to claim 1, wherein receiving the channel assignment message at the mobile station comprises receiving a traffic channel assignment (TCA) message transmitted from a base station.

5. The method according to claim 1, wherein turning off the second reverse link frequency comprises autonomously turning off said second reverse link frequency.

6. The method according to claim 3, wherein said long code mask for each of said reverse link feedback channels is identified by a two bit feedback multiplexing index.

7. The method according to claim 4, wherein the assigning multiple long code masks comprises associating multiple long code masks with said reverse link feedback channels, wherein said reverse link feedback channels are code division multiplexed.

8. The method according to claim 7, wherein said long code mask for each of said reverse link feedback channels is identified by a feedback multiplexing index of more than two bits.

9. The method according to claim 6, wherein said long code mask comprises an index field and an access terminal identifier field.

10. The method according to claim 8, wherein said long code mask comprises an index field and an access terminal identifier field.

11. The method according to claim 1, wherein the forward link channels are equal in number to the reverse link feedback channels.

12. The method according claim 1, wherein turning off said second reverse link frequency comprises turning off pilot and data signals on said second reverse link frequency.

13. A communication apparatus, comprising:
   a transmitter;
   a receiver operably connected to said transmitter;
   a processor operably connected to said transmitter and said receiver; and
   memory operably connected to said processor, wherein said communication apparatus is adapted to execute instructions stored in said memory comprising:
     receiving a set of long code masks, wherein each long code mask in the set of long code masks includes a multiple bit feedback multiplexing index correlating one forward link channel on one forward link frequency with one reverse link frequency;
     receiving a channel assignment message, the channel assignment message assigning a first reverse link frequency and specifying relationships between a plurality of forward link frequencies and at least one reverse link frequency;
     assigning a first long code mask to a first frequency of a forward link channel according to a first multiple bit feedback multiplexing index and assigning a second long code mask to a second frequency of the forward link channel according to a second multiple bit feedback multiplexing index;
     multiplexing the first frequency of the forward link channel to the first reverse link frequency using the first long code mask and the second frequency of the forward link channel to the first reverse link frequency using the second long code mask; and
     turning off a second reverse link frequency that the communication apparatus is configured to employ for sending data.

14. The communication apparatus according to claim 13, wherein said at least two channels comprise an acknowledge channel and a data rate control channel.

15. The communication apparatus according to claim 13, wherein said at least two channels are code division multiplexed.

16. The communication apparatus according to claim 13, wherein receiving the channel assignment message comprises receiving a traffic channel assignment (TCA) message transmitted from a base station.

17. The communication apparatus according to claim 13, wherein turning off the second reverse link frequency comprises autonomously turning off said second reverse link frequency.

18. The communication apparatus according to claim 15, wherein said long code mask for each of said reverse link feedback channels is identified by a two bit feedback multiplexing index.

19. The communication apparatus according to claim 16, wherein the assigning multiple long code masks comprises associating multiple long code masks with said reverse link feedback channels, wherein said reverse link feedback channels are code division multiplexed.

20. The communication apparatus according to claim 19, wherein said long code mask for each of said reverse link feedback channels is identified by a feedback multiplexing index of more than two bits.

21. The communication apparatus according to claim 18, wherein said long code mask comprises an index field and an access terminal identifier field.

22. The communication apparatus according to claim 20, wherein said long code mask comprises an index field and an access terminal identifier field.

23. The communication apparatus according to claim 13, wherein the forward link channels are equal in number to the reverse link feedback channels.

24. The communication apparatus according to claim 13, wherein turning off said second reverse link frequency comprises turning off pilot and data signals on said second reverse link frequency.

25. A communication apparatus, comprising:
receiving means for receiving a set of long code masks, wherein each long code mask in the set of long code masks includes a multiple bit feedback multiplexing index correlating one forward link channel on one forward link frequency with one reverse link frequency and receiving a channel assignment message, the channel assignment message assigning a first reverse link frequency and specifying relationships between a plurality of forward link frequencies and at least one reverse link frequency;
processor assigning means for assigning a first long code mask to a first frequency of a forward link channel according to a first multiple bit feedback multiplexing index and assigning a second long code mask to a second frequency of the forward link channel according to a second multiple bit feedback multiplexing index;
processor multiplexing means for multiplexing the first frequency of the forward link channel to the first reverse link frequency using the first long code mask and the second frequency of the forward link channel to the first reverse link frequency using the second long code mask; and
processor switching means for turning off a second reverse link frequency that the communication apparatus is configured to employ for sending data.

26. The communication apparatus according to claim 25, wherein said at least two channels comprise an acknowledge channel and a data rate control channel.

27. The communication apparatus according to claim 25, wherein said at least two channels are code division multiplexed.

28. The communication apparatus according to claim 25, wherein the receiving means comprises means for receiving a traffic channel assignment (TCA) message transmitted from a base station.

29. The communication apparatus according to claim 25, wherein the processor switching means comprise processor controlling means for autonomously turning off said second reverse link frequency.

30. The communication apparatus according to claim 27, wherein said long code mask for each of said reverse link feedback channels is identified by a two bit feedback multiplexing index.

31. The communication apparatus according to claim 28, wherein the processor assigning means comprises means for associating multiple long code masks with said reverse link feedback channels, wherein said reverse link feedback channels are code division multiplexed.

32. The communication apparatus according to claim 31, wherein said long code mask for each of said reverse link feedback channels is identified by a feedback multiplexing index of more than two bits.

33. The communication apparatus according to claim 30, wherein said long code mask comprises an index field and an access terminal identifier field.

34. The communication apparatus according to claim 32, wherein said long code mask comprises an index field and an access terminal identifier field.

35. The communication apparatus according to claim 25, wherein the forward link channels are equal in number to the reverse link feedback channels.

36. The communication apparatus according to claim 25, wherein turning off said second reverse link frequency comprises turning off pilot and data signals on said second reverse link frequency.

37. A non-transitory computer-readable medium embodying a set of instructions executable by one or more processors, comprising:
code for receiving a set of long code masks, wherein each long code mask in the set of long code masks includes a multiple bit feedback multiplexing index correlating one forward link channel on one forward link frequency with one reverse link frequency;
code for receiving a channel assignment message, the channel assignment message including an index assigning a first reverse link frequency and specifying relationships between a plurality of forward link frequencies and at least one reverse link frequency;
code for assigning a first long code mask to a first frequency of the forward link channel according to a first multiple bit feedback multiplexing index and assigning a second long code mask to a second frequency of the forward link channel according to a second multiple bit feedback multiplexing index;
code for multiplexing the first frequency of a forward link channel to the first reverse link frequency using the first long code mask and the second frequency of the forward link channel to the first reverse link frequency using the second long code mask; and
code for turning off a second reverse link frequency that the mobile station is configured to employ for sending data.

* * * * *